Feb. 17, 1942. W. G. HARDING ET AL 2,273,769
GYROSCOPE
Filed Oct. 18, 1938 7 Sheets-Sheet 4

INVENTORS
WILLIAM G. HARDING &
ROBERT H. NISBET
by
*Herbert H. Thompson*
THEIR Attorney Feb. 17, 1942.　　W. G. HARDING ET AL　　2,273,769
GYROSCOPE
Filed Oct. 18, 1938　　7 Sheets-Sheet 5

INVENTORS
WILLIAM G. HARDING
ROBERT H. NISBET
by
Herbert H. Thompson
THEIR Attorney Feb. 17, 1942. W. G. HARDING ET AL 2,273,769
GYROSCOPE
Filed Oct. 18, 1938   7 Sheets-Sheet 6

Fig. 7.

INVENTORS
WILLIAM G. HARDING
ROBERT H. NISBET
by
Herbert H. Thompson
THEIR Attorney

Fig. 9.

INVENTORS
WILLIAM G. HARDING
ROBERT H. NISBET
BY
Herbert H. Thompson
THEIR ATTORNEY Patented Feb. 17, 1942

2,273,769

UNITED STATES PATENT OFFICE 2,273,769

GYROSCOPE

William George Harding, Whitton, and Robert Hayes Nisbet, Osterley, England, assignors to Sperry Gyroscope Company, Inc., Brooklyn, N. Y., a company of New York Application October 18, 1938, Serial No. 235,546 In Great Britain October 27, 1937

10 Claims. (Cl. 33—226)

This invention relates to precision directional gyroscopes, i. e. directional gyroscopes that are intended to maintain with considerable accuracy a constant direction relative to the earth.

Directional gyroscopes tend to maintain a fixed direction in space irrespective of the earth's rotation, but frictional forces or inaccuracies of balance about the axes of support cause the gyroscope to wander from its original direction. In order to provide a fixed direction on moving vehicles, such as ships, it is therefore usual to employ a gyroscopic compass—i. e. a directional gyroscope provided with a gravitational control to make the gyroscope north-seeking. The compass then tends to maintain a fixed direction relative to the earth instead of relative to space.

Gyroscopic compasses, however, owing to their gravitational control, are subject to small errors on change of course or speed of the ship and are, moreover, liable to oscillations, usually of a fraction of a degree, from side to side about the meridian.

For special purposes, therefore, such as the provision of a base line fixed in direction for the control of gun fire, a gyroscopic compass is not entirely satisfactory, and it has been proposed to use instead specially accurate directional gyroscopes not provided with a gravitational control. Since these gyroscopes are not controlled to seek a particular direction, they are likely to wander continuously in one direction. However, if this rate of wander is slow and constant, the gyroscope may be better for the purpose in question than a gyroscopic compass in which the wander is irregular.

Accurate directional gyroscopes of the kind described are very difficult to construct, as not only must all the usual sources of disturbances present in gyroscopic apparatus be reduced to the utmost possible extent, but, also it is necessary to provide control means for ensuring that the axis of the gyroscope remains constant in direction relative to the earth instead of relative to space. In other words, the gyroscope must be compensated for the rotation of the earth. Also, it is to be noted that the compensating devices must be variable, and therefore adjustable, in accordance with latitude and in accordance with the ship's speed and course; previously proposed compensating devices were such as to render it difficult to calibrate the adjustments and to ensure the constancy and accuracy of the calibration.

According to a feature of the invention, we use a device for applying torques to the gyroscope for compensating it for the earth's rotation, which applies the same torque or the same force to the sensitive element in all latitudes, the adjustment for latitude being effected by varying the direction of the axis of this torque or force. In this way the calibration of the adjustment of the compensating device can readily be checked for all latitudes, as will be evident from the description given below of two embodiments of the invention.

According to one feature of our invention we provide a device for compensating the earth's rotation, which is stabilized in two planes, at least one of these planes being gyroscopically stabilized: in this way we avoid errors due to the rolling and pitching of the ship. In the preferred form of our invention the compensating torques are applied by the reaction of an air jet, or of air jets, mounted on the rotor case, so that the axis of the torque applied by the air jets is fixed relatively to the rotor case and is therefore gyroscopically stabilized in one plane by the directional gyroscope itself. The rotor case is stabilized also around the axis of the gyroscope; this is brought about by the fact that the rotor case is supported (with freedom to tilt) in bearings in a supporting member (e. g. a vertical cardan ring) which is pendulously mounted with freedom to tilt or oscillate about an axis parallel to the gyro axis. The axis of the torque applied by the compensating device is therefore stabilized by gravity in one vertical plane, and by the gyroscope in a perpendicular vertical plane. Preferably, the pendulous member supporting the rotor case is suspended in gimbals, so that it is free to oscillate in any plane.

The invention is particularly suitable for effecting compensation of the earth's rotation for gyroscopes with horizontal axes—such as gyro compasses or azimuth, or so-called directional gyroscopes, which should maintain their axes in a fixed horizontal direction relative to the earth. The invention can be carried into effect no matter what direction is chosen for the normal direction of the axis of the gyroscope, but we prefer always to operate it with the gyro axis in the same cardinal direction—i. e. always north/south or always east/west in order to avoid having to adjust the device compensating for the earth's rotation in accordance with the direction of the axis of the gyroscope. Clearly, however, our invention is applicable to more general uses in which the directional gyroscope may be given any initial direction and it is not difficult to provide adjustments to compensating devices in accordance with the invention so that they can be used for any direction of the axis of the gyroscope.

In the preferred form of our invention the torques applied to the gyroscope are applied by the reaction of air jets issuing from nozzles mounted on the rotor case. Preferably only one air jet and one nozzle is used and we make adjustments for latitude by varying the direction of the nozzle from which the air jet issues. As applied to a gyroscope the normal position of whose axis is east/west, we mount a nozzle at any convenient point on the rotor case that is sufficiently spaced in a direction parallel to the rotor axis from the vertical plane containing the horizontal and vertical sensitivity axes of the gyroscope and we turn the nozzle from a horizontal position towards a vertical position as the latitude varies from the equator to the north pole. In this way the torque changes from one about the vertical axis when the ship is at the equator, to an equal torque about the horizontal axis at the north pole. At an intermediate latitude the nozzle is set to a intermediate position, so that the torque is partly around the vertical axis and partly around the horizontal axis of support, as is required at the latitude in question.

In another form of our invention suitable for a gyroscope with a north/south axis of spin we mount the nozzle with its mouth on the axis of spin of the gyroscope and adjust it so that at the equator the jet issues along the rotor axis, turning it towards a vertical position suitable for use at the north pole. At the north pole the torque is around the horizontal axis of support while at the equator there is no torque at all on the rotor case, merely a thrust.

In both these forms of our invention, the nozzle has to be turned through an angle equal to the latitude angle, so that a simple uniform scale of degrees is all that is necessary as a scale for the latitude adjustment. Both these forms of the invention therefore comprise a gyroscope and an air-jet nozzle for compensating for the earth's spin, the axis of the nozzle being parallel to the earth's axis.

We may supply the nozzle with a stream of air from an external source, or with one generated from the rotation of the rotor itself and picked up by a scoop on the casing. Preferably we lead the air through a regulating valve by which we can regulate the magnitude of the air-jet reaction. One of the advantages of our invention is that a constant air-jet reaction is required for all latitudes for a given speed of the rotor, so that if the regulating valve is adjusted to compensate for the earth's rotation in one latitude (e. g. that of the factory in which the apparatus is made) it is then known that the compensation is correct for all latitudes.

According to another feature of our invention, we provide air-jet means for correcting any residual slow tilt of the gyroscope, which may be present owing to friction around the vertical axis, or due to slight inaccuracy of the device for compensating the earth's rotation.

These means comprise auxiliary air-jets arranged for exerting a torque about the vertical axis of the gyroscope. Air is supplied to these jets through ports controlled by a pendulum mounted on the gyro casing and the flow of air to these ports is so balanced that, when the rotor is horizontal, the two jets exert equal and opposite torques about the vertical axis. When, however, the rotor case tilts, the pendulum becomes displaced relatively to the ports, so that more air is supplied to one jet than to the other, with the result that an erecting torque is applied to the gyroscope.

One of the features of our invention is that the ports are arranged as exits from a chamber containing high pressure air for supplying the air jets, and the pendulum is mounted inside this chamber so as to control the flow of air through the ports. Preferably, the chamber containing the high pressure air and the pendulum is mounted on the rotor case, although it could be mounted on a member following up the rotor case so as to tilt with it. In the latter case, the air jets preferably exert their torques by impact against the rotor case, but in the preferred form of our invention, in which the chamber is mounted on the rotor case, the air jets exert their torques by the reaction of the issuing air.

According to another feature of our invention, in order to make the instrument very sensitive to tilt, we use a fairly long pendulum mounted for tilt on a knife edge resting on a support of special construction, and we damp any oscillatory motion of the pendulum relative to the member on which it is supported—e. g. the rotor case—by attaching to the pendulum a paddle which is immersed in a viscous liquid. In this way, the displacement of the pendulum produced by acceleration forces brought into existence during rolling and pitching of the ship, is out of phase with the forces themselves with the result that intercardinal rolling errors are prevented.

Clearly, this pendulum and air port device for exerting correcting torques on a gyro when its axis tilts from its normal position, can be applied to gyroscopes of types other than the present one. In particular, it can be applied to damp the oscillations of a gyro compass.

Other features of our invention, contributing to its success, are special bearings provided for the tilt axis of the rotor case, and a special knife edge bearing for the tilt axis of the pendulum, at both of which it is extremely important that friction and other irregularities shall be very small.

For the tilt axis of the rotor case, we provide bearings on opposite sides of the rotor case each comprising a conical inner race solid with the rotor casing and acting as a pivot for the rotor case; the outer race is spherical, or preferably part-spherical, so that the bearing is completely self-aligning. We use three balls only in this bearing, since, in the absence of deformation, no more than three balls in a self-aligning bearing of this type can actually take the load simultaneously; and since, by restricting the total number to three, we ensure that it is always the same three balls that take the load. In this way, and by keeping the three balls uniformly spaced, we ensure absolute constancy of the conditions of operation. In order to keep the balls uniformly spaced, we use a cage preferably constructed from a solid piece of bronze having an inner conical tunnel and an outer spherical surface, so that it fits between the inner and outer races with a slight clearance on each. Three radial holes are drilled to take the balls. These holes are of reduced diameter where they emerge at the inner conical tunnel through the cage, so that shoulders are formed there which act as retainers for the balls so as to facilitate assembly.

For the knife edge bearing for the pendulum we use two knife edges formed on the same block of material, the pendulum being fixed into this block between the two knife edges. As a support for each of the knife edges, we use two hard steel balls resting in a horizontal rectangular groove slightly wider than the diameter of the balls. The two grooves are accurately in line, as also are the two knife edges, which together, form a single knife edge resting on four balls, two of which are slightly to one side of the edge, while the other two are on the other side. In order to prevent longitudinal motion of the knife edge parallel to itself, we provide two additional balls one in each of the horizontal grooves. These balls are larger than the supporting balls, and they act as abutments or stops for longitudinal displacement of the knife edge. The longitudinal groove containing the large ball and the small balls is made just wide enough to take the large ball. Under the weight of the pendulum one of the small balls is forced to one side of the groove, while the other is forced to the other side, so that the knife edge which lies over the centre line of the groove rests on the inner inclined surfaces of the balls and is thus located at four points. The size of the smaller balls is so chosen, relative to that of the large ball, that the line of the knife edge is at the same height as the centre of the large ball, so that the portion of the surface of this large ball against which the knife edge abuts is vertical.

Another feature contributing to the freedom of the gyroscope about the sensitive horizontal and vertical axes is the special means we adopt for taking electrical connections to the rotor to provide current for driving the rotor. The rotor case is provided with a stator winding provided with three phase current for driving the rotor as an induction motor, and three connections are necessary to lead in the three phase current.

The rotor case, as has been explained above, is mounted with freedom to tilt in bearings in a vertical cardan ring which is in turn free to rotate about a vertical axis. As in the Sperry form of gyroscopic compass this vertical ring is supported by a suspension wire so that it hangs from a "phantom" or follow-up member which is driven by a servo motor to follow-up the movements of the vertical ring about a vertical axis. Electrical connections are taken from outside by means of slip rings to the "phantom" element and then have to be taken from there to the rotor case.

In gyroscopic compasses of former types electrical connections were taken from the "phantom" element to the suspended vertical ring by means of flexible connectors as close as possible to the vertical axis and they were then taken from the vertical ring to the rotor case by means of flexible connectors as close as possible to the horizontal axis. In the present improved construction, which is also applicable to gyroscopic compasses, we take connections directly from the "phantom" element to the rotor case by means of electrodes dipping into containers containing a conducting fluid such as mercury.

In the preferred embodiment we mount three Bakelite containers on the "phantom" element opposite the horizontal tilt axis of the rotor case and we secure a bracket to the rotor case carrying three rods dipping into the three containers which are filled with mercury. The containers are elongated so that relative movement to a limited extent is possible between the vertical ring and the "phantom" element about the vertical axis, and relative movement to a limited extent between the vertical ring and the rotor case about the horizontal axis, without the rods striking against the sides of the containers. The current is led in by steel connections to the containers, then via the mercury pools to the conducting rods leading into them from which connections are taken along the bracket to the rotor case, dipping into the pools and then via conductors leading along the bracket to the rotor case.

The invention will now be particularly described with reference to the accompanying drawings in which.

Referring to the drawings, 1 is the main supporting frame of the gyroscope, which supports the inner or rotating element with freedom to rotate about the normally vertical axis A—A. The whole combination is pendulous about the axis B—B, about which the frame 1 is pivotally supported in a horizontal cardan ring (not shown), which is itself pivotally supported on an axis C—C perpendicular to B—B. The whole combination can, therefore, hang freely, irrespective of tilting of the craft on which it is mounted, and it is so adjusted that the axis A—A is normally vertical.

The inner or rotating element comprises a sensitive element, consisting of the rotor case 2 and vertical ring 3, and a follow-up element 4. The follow-up element 4 is carried with freedom to rotate about the axis A—A in bearings (not shown) in a central bore in the main frame 1, and to it is rigidly secured the azimuth gear 5 and the compass card 6; and a follow-up inductive controller 7 (Fig. 1) is mounted on it, which co-operates with an armature 8 rigidly secured to the vertical ring 3 so as to detect relative displacement between this ring and the follow-up member 4. The controller 7 controls a conventional azimuth motor (not shown), which is fixed to the main frame 1 and is in gearing engagement with the azimuth gear 5, causing it to drive the follow-up member 4 to keep substantially in step with the ring 3, instead of turning about the ring 3 with the craft and with the main frame 1. (Methods of controlling the motor from an inductive controller similar to 7, 8, are described in United States Patents 1,887,318, and 2,139,558.)

The relative movement between rings 3 and 4 is therefore at all times extremely small. Frame or ring 3 is mounted for freedom about the axis A—A by means of pivot studs 10, 11 rigidly secured to the frame 3 and engaging in guide bearings 10', 11' housed in the follow-up member 4.

The sensitive element consisting of the rotor case 2 and vertical ring 3, hangs from a nut 13 resting on a central boss of the card 6, by means of a stranded torsion-free wire suspension 12, which passes down the central hollow stem of the follow-up element 4. Thus the weight of the sensitive element is taken by the follow-up element by means that ensure that the frictional torques about the axis A—A are extremely slight.

The rotor case 2 is free to pivot about the horizontal axis D—D, which is defined by the engagement of pivot studs such as 14 in bearings 15 housed in the follow-up element 4, and the casing as a whole is balanced in neutral equilibrium about the axis D—D. The rotor turns within the casing 2 about a horizontal axis E—E perpendicular to D—D.

Figure 1:
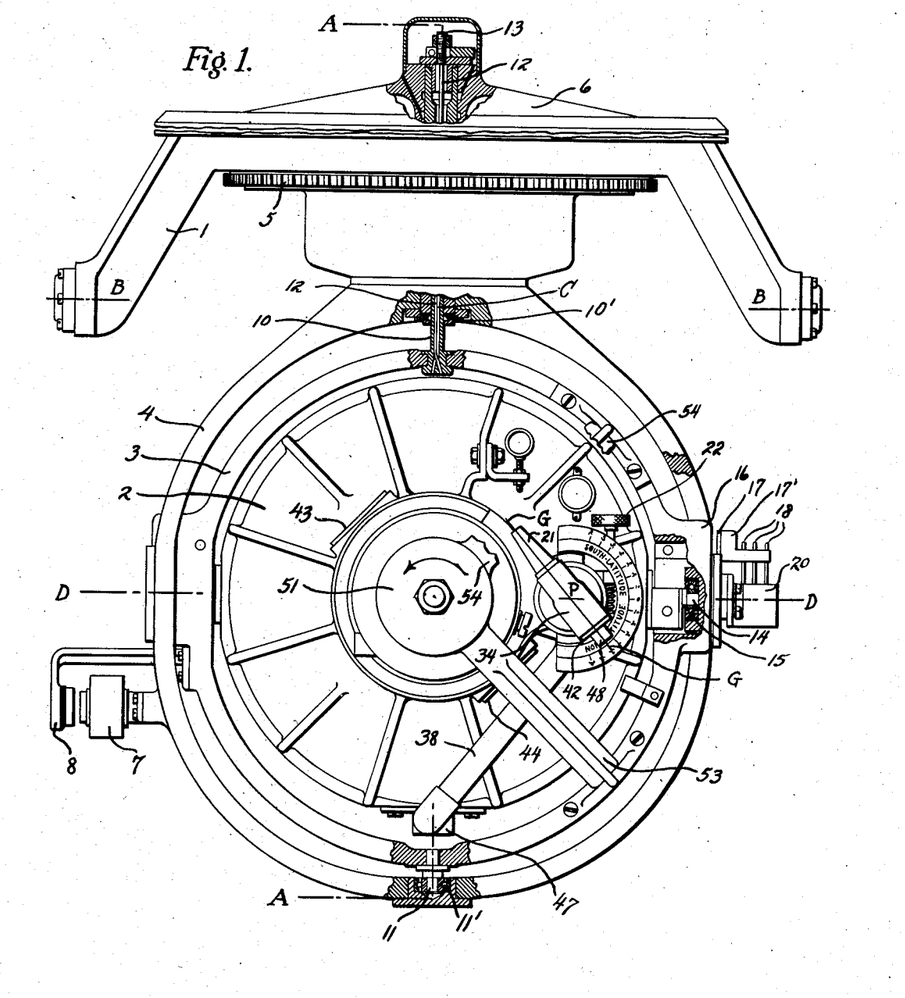
Fig. 1 is an elevation of a gyroscope according to the invention, as seen from a point on the rotor axis; this figure illustrates the air jet device for compensating for the earth's rotation.
Figure 2:
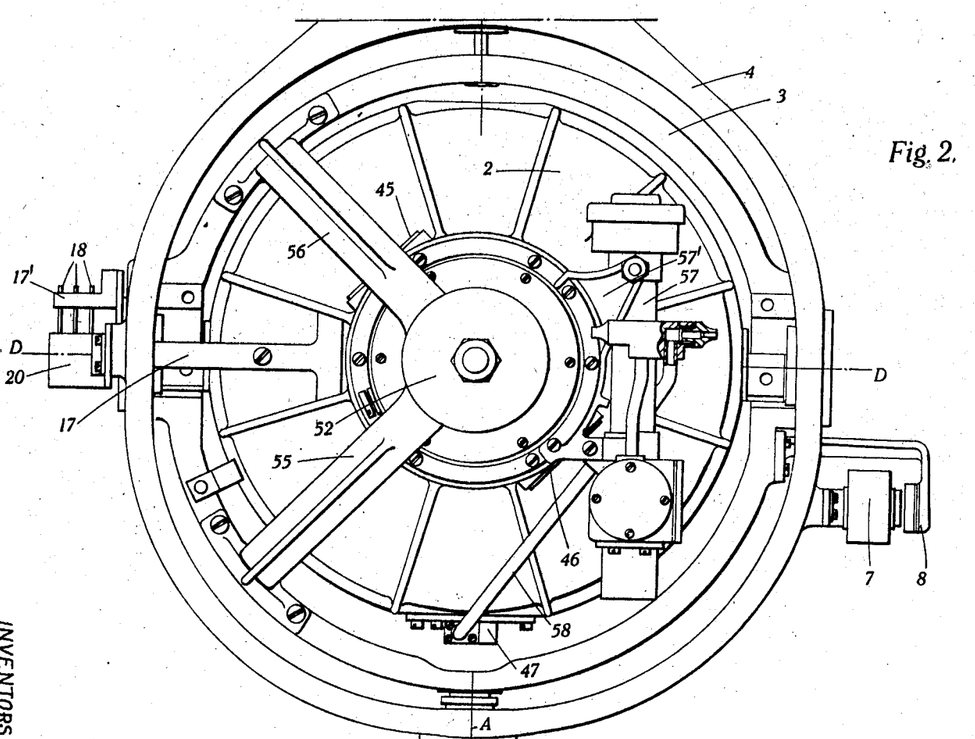
Fig. 2 is an elevation of the same gyroscope as seen from a point on the rotor axis on the opposite side of the instrument.

In the normal condition of use the axis D—D lies north and south, the rotor axis E—E being east-west and horizontal. Fig. 1 is an elevation of the gyroscope as seen from the west and Fig. 2 an elevation as seen from the east.

The rotor is driven as an induction motor by three-phase electrical currents. The currents are led from outside, first by way of the supporting cardan ring to the frame 1, and thence by slip rings to the follow-up member 4. In the allied art of gyro-compasses it has been usual to lead the currents to the rotor case by means of very flexible conducting wires bridging across from the follow-up member 4 to the vertical ring 3 as near as possible the axis A—A and from the vertical ring 3 to the rotor case 2, as near as possible to the horizontal axis D—D. However, in directional gyroscopes of the present type it is more important even than in gyro-compasses to reduce friction and we adopt a different method of leading the currents across to the rotor case.

Figure 3:
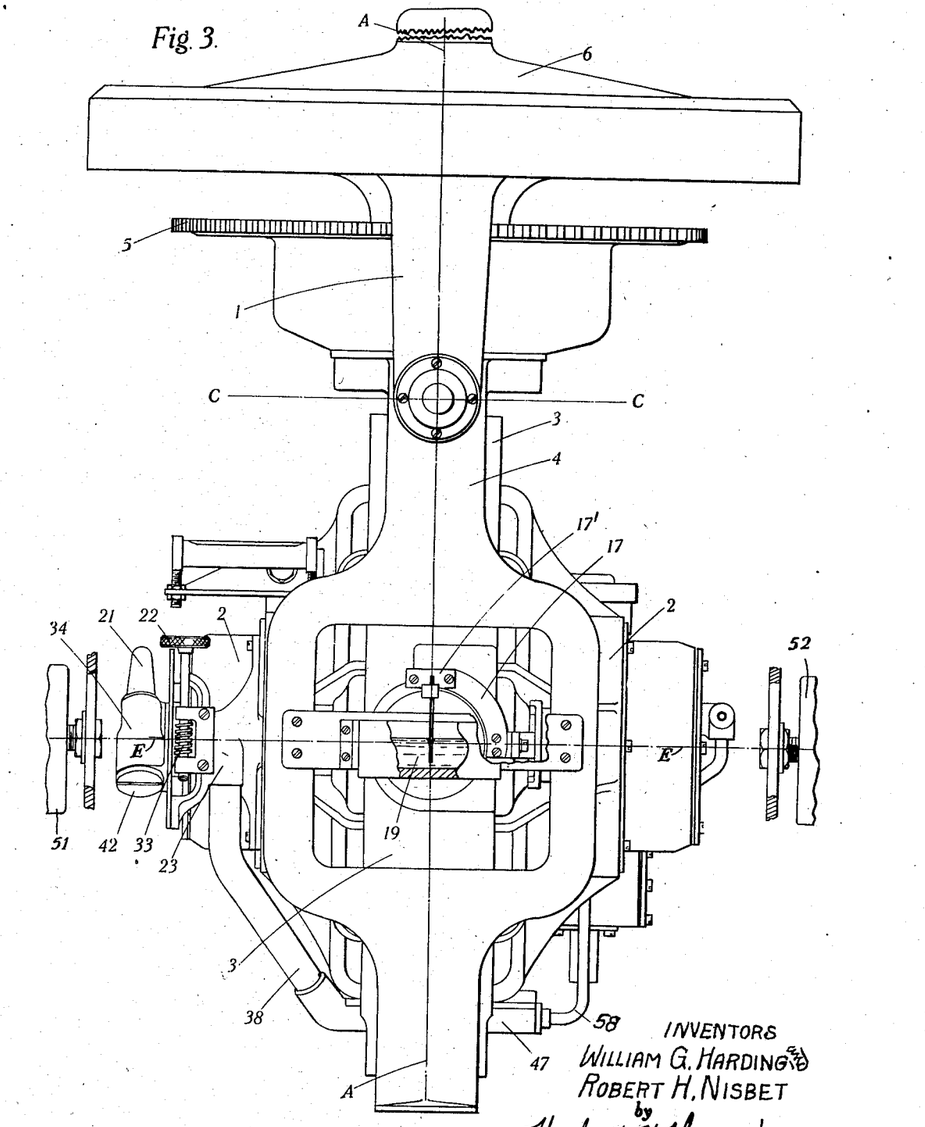
Fig. 3 is an elevation of the gyroscope as seen from a point in the meridianal plane of the gyro rotor.

As shown in Fig. 3 each side of the follow-up member 4, which is shaped generally as a ring in a vertical plane, is expanded in the neighbourhood of the axis D—D, to form a large boss having a square window. In the neighbourhood of the horizontal axis D—D, the vertical ring 3 is also provided with protuberant bosses 16 which protrude into the windows in the follow-up member 4. Secured to the rotor case 2 is a bracket 17 that carries a block 17' of insulating material in which are fixed three rods 18 of stainless steel. These rods extend downwards into three troughs of mercury 19 in a block 20 of insulating material which is mounted on a bracket rigidly fixed across the window in the follow-up element 4. The three-phase electrical supply lines on the follow-up element 4 are led to the three mercury troughs and the three rods 18 are connected to the windings in the rotor case of the rotor-driving induction motor. It can readily be seen that the current supply connections are continuous whether the rotor case tilts about the axis D—D or whether the vertical ring 3 rotates relative to the follow-up member 4 about the axis A—A, and that the torques provided by the connections in opposition to such movements are of the slightest.

A gyroscope, constructed as so far described, and started-off with its axis horizontal, would tend to keep its axis in the same direction in space. The axis would, therefore, change direction relative to the earth's axis, whereas what is required is a gyroscope whose axis remains stationary relative to the earth's axis, i. e., stays horizontal and maintains the same direction. Torques are required which will give to the gyroscope the required rates of precession around the vertical and horizontal axes, both these rates being variable with latitude. We provide these torques simultaneously by a single torque-giving device, which is adjustable according to latitude in such a manner that the axis of the torque is stabilised in one plane by the gyroscope itself and in a perpendicular plane by gravity, whereby rolling of the craft on which the gyroscope is mounted does not give rise to errors. For this purpose we use an air-jet reaction device to supply the torque, and we mount it directly on the rotor case.

The air-jet reaction device consists of a nozzle 21, so mounted in the rotor case that it can be adjusted about an axis F—F parallel to the rotor axis by means of a tangent screw head 22, the axis G—G of the nozzle being at all times perpendicular to the axis F—F.

In order to secure these results, the axis F—F is defined by the axis of a tubular member 23 (Figs. 3 and 4), provided with a central boss 26 and with flanges 24, 25, by which it is screwed to the rotor case. The open end of the tube 23 is machined to provide a conical surface, which acts as the bearing for the mushroom-shaped rotatable carriage 27. A hole is drilled through this carriage along its axis so that the stem 28 becomes a hollow tube with a lip 29 at one end. The diameter of this tube is smaller than the internal diameter of tube 23 so that an annular channel surrounds the tube 28. The rotatable carriage 27 is held securely on to its conical seating at the end of tube 23 by means of pressure applied by the spring 30 which is compressed between the lip 29 and a washer 31 held securely on the end of boss 26 by a screw 32. The head of the carriage 27 is provided with worm-wheel teeth round its circumference, with which teeth there engages the tangent screw 33 operated by the screw-head 22.

Figure 4:
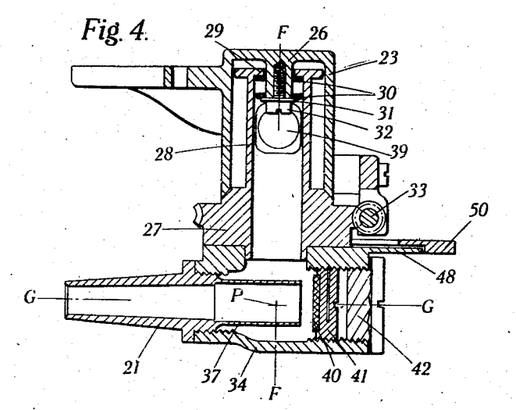
Fig. 4 is a horizontal sectional view of the air jet device.
Figure 5:
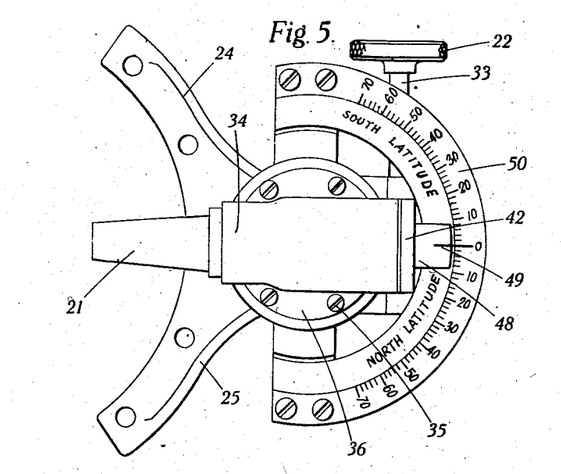
Fig. 5 is an elevation of the air jet device as in Fig. 1 but shown on a larger scale.

The nozzle 21 is supplied with air from an air pressure chamber 34, a flange 36 of which is fixed to the carriage 27 by means of screws such as 35 (Fig. 5). The chamber 34 is hollow, being drilled through along the axis G—G and the nozzle 21 is screwed into the left-hand end, as seen in Fig. 4, of the tube so formed.

The nozzle 21 is provided with an extension tube 37 entering the chamber 34 to a point well past the axis F—F, thus providing a long straight course for the air before it emerges from the nozzle.

Air is supplied to the under side of the tube 23 through a supply pipe 38, from which it passes into the annular space surrounding tube 28 and thence into tube 28 by holes 39. The air then flows inside tube 28 to the annular space inside chamber 34 surrounding the nozzle extension tube 37, and thence into the extension tube 37 between the end of this tube and the back plate 40. The latter is solid with a self-locking split nut 41 screwed into the right hand end, as seen in Fig. 4, of the chamber 34. The nut is adjustable by means of a screw-driver after removal of the cover screw 42. Such an adjustment varies the constriction between the end of tube 37 and plate 40, and consequently varies the flow of air from nozzle 21; it is used to adjust the reaction from the nozzle to the correct value to compensate for the earth's spin.

Air for supplying the air jet is derived in the present case from the spinning rotor, although it is equally possible, in known manner, to lead compressed air from outside, or from the follow-up element, through channels in the supporting rings and through the bearings.

In the embodiment of the invention illustrated in the drawings, air is admitted to the rotor case through windows provided with perforated cover screens 43, 44, 45, 46, to act as filters preventing ingress of foreign matter. The entering air is whirled round and flung outwards by the spinning gyro rotor and the resulting high-speed air stream is collected from the circumference of the rotor by a scoop attached to the inside of the periphery of the rotor case. The scoop directs the air stream into a collector box 47, which acts as the source of high pressure air for the pipe 38, leading to the air jet device.

The letter P denotes the point of intersection of the axes G—G and F—F of the air jet device, whilst O denotes the intersection of axes A—A and D—D of the gyroscope, and $d$ denotes the distance of P from the vertical plane AOD i. e. the component of OP parallel to the gyro axis.

As shown in Figs. 1 and 3. the axis of the air nozzle is inclined upwards from the horizontal. Let the angle of inclination be $\theta$. The reaction of the air jet is a thrust on the nozzle acting downwards and to the right along the axis G—G. The magnitude of this force is denoted by F. The vertical component of this force, F sin $\theta$, exerts a clockwise torque F sin $\theta.d$ about the half-axis O—D extending to the right in Fig. 1, and the horizontal component exerts a clockwise torque F.cos $\theta.d$ about the upwardly directed vertical.

Thus the gyro is caused to precess so that the westerly end of the axis (the end seen in Fig. 1) turns toward the axis O—D at a rate proportional to sin $\theta$ and towards the vertical at a rate proportional to cos $\theta$. The casing is thus given a clockwise rotation having a component proportional to cos $\theta$ about a northerly directed axis and a component proportional to sin $\theta$ about the vertical. The resultant rotation is therefore about an axis elevated through an angle $\theta$ from the true north. This is parallel to the axis of the earth provided that the angle $\theta$ corresponds to the latitude of the place in which the instrument is being used. It then follows that to compensate for the earth's spin it is merely necessary to tilt the jet or nozzle 21 so that its axis G—G makes with the horizontal an angle equal to the latitude. It is interesting to note in this connection that by always setting the jet angle equal to the latitude, the jet is actually kept always parallel to the earth's axis of spin. In other words, the jet will point to the north star.

For this purpose the chamber 34 is provided with a tongue 48 on which is engraved an index mark 49. When the nozzle 21 is elevated or depressed by means of screw knob 22, index mark 49 travels over a fixed circular scale 50 which is calibrated in degrees of north and south latitudes the scale being a uniform circular scale.

It follows from the foregoing that, if the thrust applied by the air jet is correctly adjusted for one latitude by means of the adjusting screw 41, it will be correct for any other latitude, provided that the index 49 is set to that latitude marking by means of the screw knob 22.

It is important that the jet from the nozzle 21 should exert only its pure reaction thrust on the sensitive element. For this reason the nozzle is made long and has the long inner extension tube 37 so that the air shall issue correctly in the direction of the geometrical axis G—G. Furthermore the expelled air must have a clear path so that it strikes neither the sensitive element again nor, indeed, any other part of the gyroscope from which it might be reflected against the sensitive element. As shown in Fig. 3 the plane of elevation of the nozzle 31 is arranged to be beyond the end of the rotor case. In addition, the compensating weights 51, 52, which, as is well known, must be attached to the vertical ring 3 in order that this element should have equal moments of inertia about axes O—D and O—E, and which are naturally disposed as far as possible from the centre of the compass, are supported on arm 53, 54, 55, 56, so disposed that the jet issuing from the nozzle does not encounter them in any position of the nozzle.

Although, in theory, the air jet from nozzle 21 will provide the correct torques to keep the gyroscope constant in direction relative to the earth, in practice the torque cannot be quite accurate, and, in addition, frictional torques come into play, thus causing the gyro to wander both in azimuth and in elevation. As a rule the wander is slow, but there is some advantage in preventing wander in elevation by the use of a special controller or tilt corrector, since, if a tilt should develop, the air jet torques would become incorrect in value. An auxiliary tilt corrector is illustrated in the drawings, details being shown in Figs. 6, 7 and 8.

The tilt corrector is completely enclosed in a casing 57 which is fixed to the rotor case by a bracket 57'. The casing 57 consists mainly of a vertical tube provided at the top with a wider cup-shaped member 59 inside which is lodged a flanged tube 60 so that an annular space is formed between this central tube and the wall of the member 59. In this annular space there is provided a ring 61 in the upper surface of which a rectangular diametral slot 62 has been cut. Two large steel balls 63, 64 and four smaller balls 65, 66, 67, 68, are confined in this slot, one large one and two small ones in each half of the slot between the outer wall of the cup 59 and the inner wall formed by the retaining tube 60. The dimensions of the slot and of the balls are such that the balls just fit in, so that the smaller balls 67, 68, are forced one against the wall and one against the other. A knife-edge prism 69 rests with its knife-edge downwards on the balls 65, 66, 67, 68 which thus form a centralising bearing confining the knife-edge to cause it to lie parallel to the centre of the slot 62 (see Fig. 8). Longitudinal movement of the prism 69 is prevented by the balls 63, 64 which the ends of the knife edge touch at points at the ends of horizontal diameters of said balls.

A cover 70 screws down on to the cup 59 to act as an airtight enclosure for the top of the casing 57. Under this cover there is a layer of rubber 71 which resiliently clamps an inner retaining cap 72 lightly on to the balls 63, 64 thus preventing vibratory motion of the balls 63—68.

Figure 6:
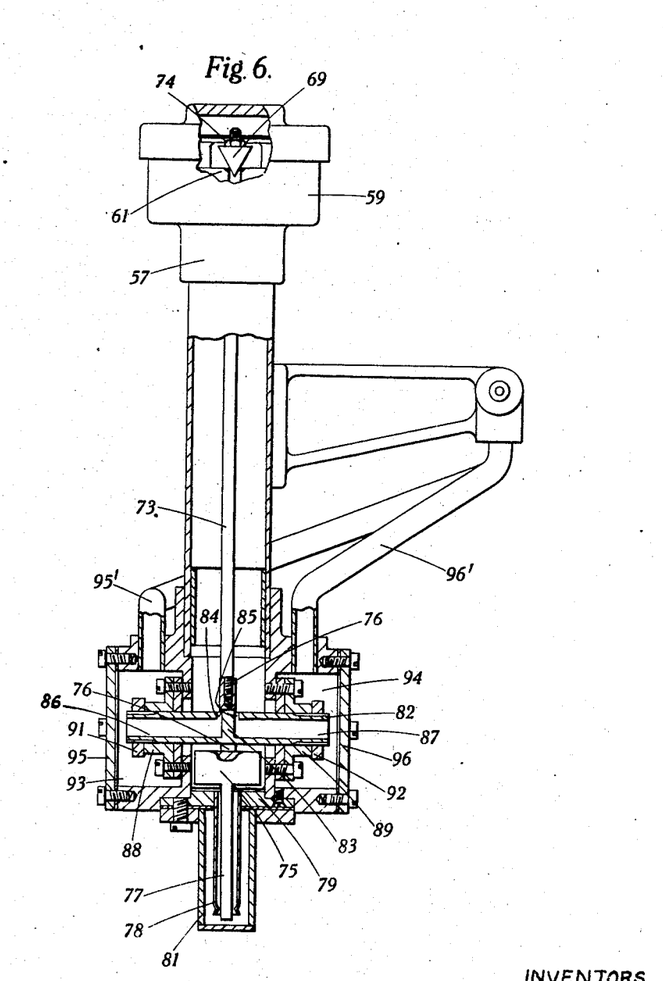
Fig. 6 is an elevation, (parts being shown in section), on a vertical plane parallel to the gyro axis, of an auxiliary pendulum device for correcting tilts of the gyro axis due to residual errors or friction.

Into the knife-edge prism there is screwed the depending rod 73 which is rigidly secured there by the lock-nut 74, and by it there is suspended the pendulum bob. The latter consists of a block of metal 75 with an upper plate 76 and a lower plate 77 extending from it, the rod 73 being screwed into the upper plate as shown in Fig. 6. The lower plate 77 is confined in a narrow space within a rectangular screen 78 which is mounted in a plate 79 secured to a casting 80 which forms an extension of the casing 57. As a result the pendulum 73, 75, 76, 77, is capable only of a very small angular movement about its knife-edge support. The rectangular screen 78 lies within an outer rectangular box 81 fixed to the under side of the plate 79; this box is filled with oil or other viscous liquid which penetrates into the narrow space between plate 77 and the screen 78. Owing to the large areas and small clearances in this space the pendulum is capable of only very slow angular movements relative to the rotor case so that it does not move appreciably as a result of acceleration forces brought into play during rolling and pitching of the craft, although it can nevertheless move slowly but freely in response to gravity after a tilt of the rotor case.

In the upper plate 76 of the pendulum bob 75 there is cut a hole through which passes the air port member 82. This is made from a solid piece of square metal rod by drilling into each end so as to leave a central partition wall 83. Saw cuts are then made in the top surface so as to form two ports 84, 85 leading respectively into the two passages 86, 87 down the two halves of the airport member 82. The member 82 is long enough to extend through holes in the vertical walls of the casting 80 and through bushes 88, 89 secured thereto, and nuts 91, 92 are provided on the ends, by means of which the air port member 82 may be adjusted longitudinally relatively to the casing 57.

The casting 80 also is extended in the direction of the axis of the air port member to form chambers 93, 94 with detachable covers 95, 96. The air expelled from tubes 86, 87 enters these chambers and leaves again by the tubes 95', 96' which lead to the oppositely directed nozzles 97, 98. The air supply for the tilt corrector is conveyed from box 47 through tube 58 to the interior of the casing 57.

Figure 7:
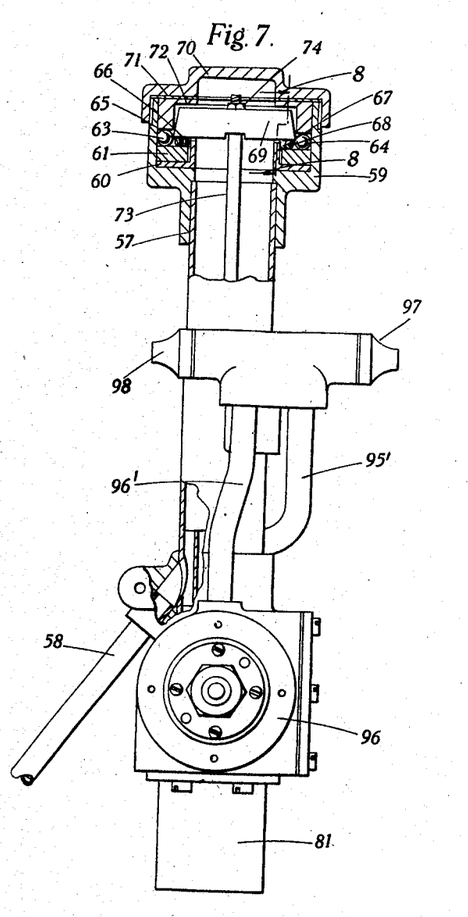
Fig. 7 is an elevation, part in section, on a vertical plane normal to the gyro axis, of the auxiliary pendulum device shown in Fig. 6.
Figure 8:
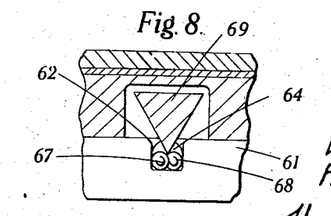
Fig. 8 is a section on the line 8—8 of Fig. 7, showing details of the knife-edge bearing of the auxiliary pendulum.

The operation of the tilt-corrector of Figs. 6, 7 and 8 is as follows. If the rotor case tilts, the pendulum remains vertical because the tilt develops at too slow a rate for the viscous drag in the container 78 to displace the pendulum. The casing 57 is therefore turned slowly under the knife edge of prism 69 and the air port member 82 is displaced with it through the hole in plate 76. The upper edge of this hole clears the upper face of the air port member by a very small distance and in the normal position half covers each of the air ports 84, 85. Tilting of the gyroscope therefore causes one port to be uncovered to a greater extent and the other to be covered to a greater extent than normal, so that the flow of air from the nozzles 97, 98, which is normally balanced, becomes unbalanced, and a differential reaction thrust is exerted on the nozzle support and therefore on the rotor case. As is evident from Figure 2, this thrust provides a torque round the vertical axis of the gyroscope; the air connections are so made that this torque is in the appropriate direction to cause the gyro axis to precess in the vertical plane to reduce the tilt towards zero.

The construction described thus provides a controller slowly responsive to tilts of the rotor case of a gyroscope and adapted to control the application of torques to the gyroscope. As such, its use is not limited to gyroscopes of the present type and it can be employed on any type of gyroscope, e. g. a gyro-compass or a gyro vertical. Among its advantageous properties are the viscous damping, the fact that the air port surface covered by the controller is parallel to the axis of the controller so that the distance between the controller and the ports is radial to this axis and is therefore invariable, and the fact that the controller and ports are both in an enclosure from which the only path of escape for air is via the air ports.

In a similar manner, the air-jet device for compensating for the earth's spin is not limited in its application to directional gyroscopes without gravitational control, but may be used for gyroscopic compasses or gyro-verticals.

Figure 9:
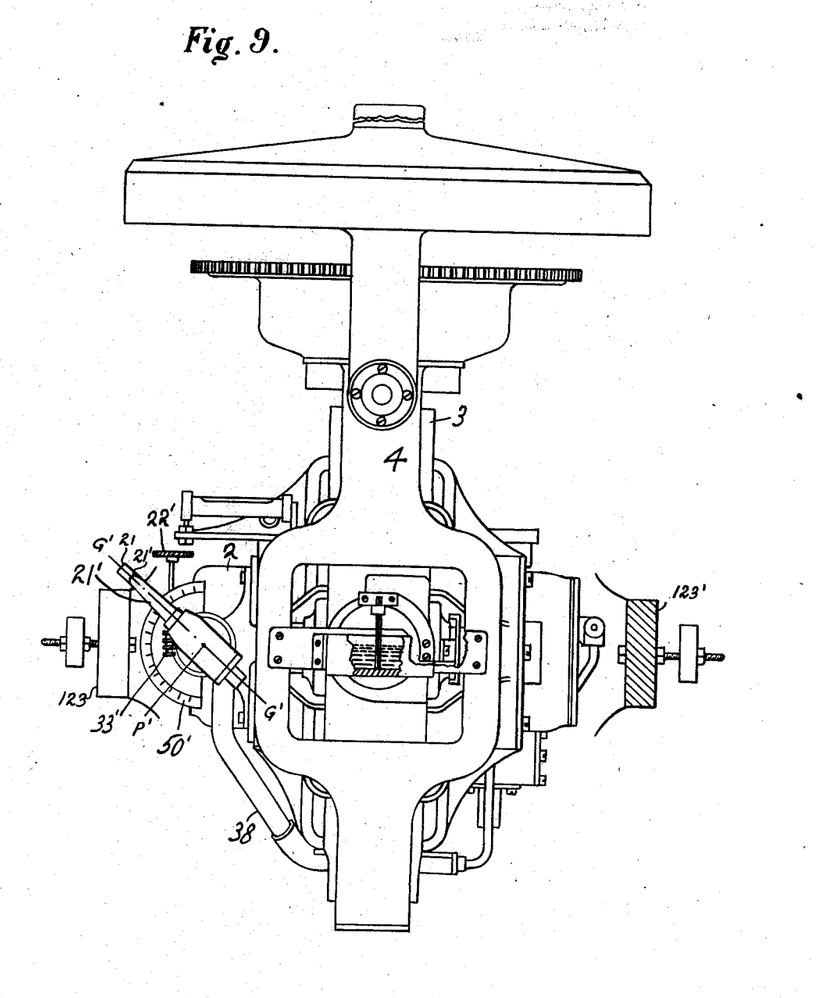
Fig. 9 is a side elevation of a modified form of directional gyroscope in which the spin axis is normally N—S.

Gyroscopic compasses or gyroscopes in which the gyro axis is north-south and horizontal require that the air-jet device should be mounted in a manner different from that illustrated herein for an east-west gyroscope. A preferred arrangement for a north-south gyroscope or gyrocompass is shown in Fig. 9, in which parts which are the same are given the same reference numerals as in Fig. 3 and parts which are similar to but somewhat different are given the same numerals primed. According to this modification, the air-jet 21' is mounted so that it elevates from a direction in line with the gyro spin axis (corresponding to zero latitude) to a vertical direction (corresponding to 90° latitude), the plane of elevation being the meridianal plane of the gyro spin axis. To accomplish this purpose, the outer end of jet pipe 21' (which is pivoted about axis P') is given a dog's leg bend, as indicated at 121, so that the nozzle 121' and, therefore, the line of action of the jet G'—G' lies in the vertical plane containing the rotor spin axis. To provide clearance, the adjacent compensating weight 123 on that side of the compass may be divided into two spaced halves. In this form of the invention, the jet applies a constant thrust to the rotor case and is so directed as to provide a torque about the horizontal axis only, this torque changing from zero to its maximum value according to the sine of the angle of the inclination of the jet, i. e. to the sine of the latitude. In this form of the invention also, since the angle of elevation is set equal to the latitude, the jet is again actually kept parallel to the earth's spin axis and therefore, in north latitude, points to the north star.

Other arrangements of the jet are possible for a north-south gyro. Thus the jet need not be positioned at a point in line with the gyro axis but may be at any convenient position. At zero latitude the line of action of the jet should be radial to the centre of the compass so as to provide no torque; for a different latitude the nozzle should be elevated in the vertical plane through this radius, so as to reach a second direction perpendicular to the first at latitude 90°.

It is of interest to note that the third direction perpendicular to these two is correct for the jet in zero latitude if the axis of the gyroscope is east-west instead of north-south, so that it would be possible, in such a gyroscope, to elevate the jet in the plane containing the third and second of the three mutually perpendicular directions as an alternative to the arrangement shown in the drawings. The plane of elevation for an intermediate direction of the gyro axis should be orientated in a direction intermediate between these two planes of elevation. It is therefore possible to make this plane of elevation adjustable to suit any desired direction of the gyro axis, while the latitude adjustment remains the same.

The invention may also be applied to a gyro vertical. In the case of a gyro vertical employing a single gyro with a vertical axis, however, it is necessary to stabilise the direction of the jet in azimuth from a compass or directional gyro.

What we claim is:

1. In a directional or free gyroscope having a normally horizontal spin axis and a horizontal pivotal axis at right angles to said spin axis, means for compensating for the earth's rotation comprising means for applying to the gyroscope a force to one side of said second axis which has the same magnitude in all latitudes and means for angularly adjusting the line of action of said force about an axis parallel to and in the same horizontal plane as said spin axis so that the angle of elevation of said means from the horizontal equals the latitude.

2. Means for compensating free or directional gyroscope for the earth's rotation as claimed in claim 1 in which said torque or force applying means comprises an air jet mounted for rotation in a vertical plane on one side of the horizontal pivotal axis of the gyroscope and means for turning said air jet upwardly or downwardly from the horizontal through an angle equal to the latitude.

3. In a free or directional gyroscope having a normally vertical axis of orientation, an E—W spin axis, and a N—S pivotal axis, means for compensating for the earth's rotation comprising an air jet device mounted on the gyroscope on one side of said pivotal and vertical axes thereof for turning about a horizontal axis and a latitude scale adjacent said air jet whereby it may be set at an angular elevation equal to the latitude to exert a torque about the vertical axis only on the equator for taking out the tilt due to the earth's rotation and for exerting a torque about the horizontal axis only at the poles for precessing the gyroscope equally and oppositely to the rotation of the earth and for giving the proper components of each motion about each axis in intermediate latitudes.

4. In a directional or free gyroscope having a normally vertical axis of orientation, a N—S spin axis and an E—W pivotal axis, an air jet device on said gyroscope rotatable in a vertical plane containing said spin axis and mounted to one side of said pivotal axis, and means for angularly adjusting said device in said plane from a horizontal N—S position at the equator upwardly or downwardly through an angle equal to the north or south latitude.

5. In a directional or free gyroscope having normally horizontal spin and tilt axes, means for compensating for the earth's rotation comprising means for applying to the gyroscope a force to one side of said tilt axis which has the same magnitude in all latitudes, and means for angularly adjusting the direction of said force about an axis perpendicular to and in the same horizontal plane as the spin axis so that on the equator said force has no effective moment about said tilt axis and the effective moment or torque about said tilt axis increases with the sine of the angle through which said force is rotated from said zero torque position.

6. In a directional or free gyroscope having normally horizontal spin and tilt axes and a normally vertical axis of orientation, means for compensating for the earth's rotation comprising means for applying to the gyroscope a force at one side of said vertical axis which has the same magnitude in all latitudes, and means for angularly adjusting the direction of said force about an axis parallel to said spin axis so that at the equator said force has a maximum effective moment about said vertical axis and the effective moment varies with the cosine of the angle through which said force is rotated from said maximum torque position.

7. A directional gyroscope as claimed in claim 6, wherein the same force is also positioned to one side of said tilt axis whereby during the angular adjustments recited said force exerts no torque about said tilt axis at the equator and varies with the sine of the angle through which said force is rotated.

8. In a free or directional gyroscope having a normally vertical axis of orientation, a normally horizontal spin axis, and a normally horizontal pivotal axis at right angles to said spin axis, means for compensating for the earth's rotation comprising an air jet device mounted on the gyroscope for turning about a horizontal axis parallel to said spin axis and spaced to one side of said pivotal and vertical axes, and a latitude scale adjacent said air jet whereby it may be set at an angular elevation equal to the latitude to exert a torque only about the vertical axis on the equator and for exerting a torque only about the horizontal axis at the poles and to give the proper components of each motion about each axis in intermediate latitudes.

9. In a gyroscopic instrument, an auxiliary pendulum therefor, a pivotal mounting for mounting said pendulum on the gyroscope including a knife edge on said pendulum and spaced bearing members on said gyroscope, including a pair of small touching balls under the knife edge near each end thereof and a large ball contacting each outside end of said knife edge, whereby ball contact is provided against both downward and lateral forces on the knife edge.

10. In a direction indicating gyroscope, such as a gyro compass, having a normally vertical axis of orientation, an E—W horizontal pivotal axis and a normally horizontal N—S spin axis, means for effecting a latitude compensation for deviation of said spin axis from the north due to the earth's rotation and its being maintained horizontal, comprising an air jet device pivotally mounted on the casing of the gyroscope for adjustment in the vertical plane containing the spin axis thereof, and a latitude scale adjacent said jet whereby it may be set at an angular elevation equal to the latitude to thereby exert a torque about said horizontal axis which is zero at the equator and which increases proportionally to the sine of the latitude.

WILLIAM G. HARDING.
ROBERT HAYES NISBET.